United States Patent
Paulsen et al.

(10) Patent No.: US 12,525,603 B2
(45) Date of Patent: Jan. 13, 2026

(54) POSITIVE ELECTRODE ACTIVE MATERIAL FOR RECHARGEABLE BATTERIES

(71) Applicant: UMICORE, Brussels (BE)

(72) Inventors: Jens Martin Paulsen, Chungcheongnam-do (KR); Shinichi Kumakura, Olen (BE); Liang Zhu, Brussels (BE); JiHye Kim, Chungcheongnam-do (KR); JiHoon Kang, Chungcheongnam-do (KR); HyeJeong Yang, Chungcheongnam-do (KR); YuRi Lee, Chungcheongnam-do (KR)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 18/265,599

(22) PCT Filed: Dec. 17, 2021

(86) PCT No.: PCT/EP2021/086386
§ 371 (c)(1),
(2) Date: Jun. 6, 2023

(87) PCT Pub. No.: WO2022/129462
PCT Pub. Date: Jun. 23, 2022

(65) Prior Publication Data
US 2024/0030408 A1    Jan. 25, 2024

(30) Foreign Application Priority Data

Dec. 18, 2020    (EP) .................... 20215507

(51) Int. Cl.
*H01M 4/36*    (2006.01)
*H01M 4/02*    (2006.01)
(Continued)

(52) U.S. Cl.
CPC .......... *H01M 4/364* (2013.01); *H01M 4/485* (2013.01); *H01M 4/525* (2013.01); *H01M 2004/028* (2013.01)

(58) Field of Classification Search
CPC ...... H01M 4/364; H01M 4/485; H01M 4/525; H01M 2004/028
See application file for complete search history.

(56) References Cited

U.S. PATENT DOCUMENTS

2011/0291044 A1    12/2011    Wang et al.
2014/0329146 A1    11/2014    Niina et al.
(Continued)

FOREIGN PATENT DOCUMENTS

CN    104300117 A    1/2015
CN    107681123 A    2/2018
(Continued)

OTHER PUBLICATIONS

ISA/EP; International Search Report and Written Opinion for International Patent Application No. PCT/EP2021/086386 dated Apr. 14, 2022, 11 pages.
(Continued)

*Primary Examiner* — Ula C Ruddock
*Assistant Examiner* — Olivia Mason Ruggiero
(74) *Attorney, Agent, or Firm* — Rimon P.C.; Allyn B. Elliott

(57) ABSTRACT

A positive electrode active material for solid state rechargeable batteries, whereby the positive electrode active material is a powder which comprises Li, M', and O, wherein M' consists of Co in a content x superior or equal to 2.0 mol % and inferior or equal to 35.0 mol %, Mn in a content y superior or equal to 0 mol % and inferior or equal to 35.0 mol %, A in a content m superior or equal to 0 mol % and inferior or equal to 5 mol %, whereby A comprises at least (Continued)

one element of the group consisting of: Al, Ba, B, Mg, Nb, Sr, Ti, W, S, Ca, Cr, Zn, V, Y, Si, and Zr, Ni in a content of 100-x-y-m mol %, a first compound which comprises $Li_2WO_4$ and a second compound which comprises $WO_3$, whereby the powder is a single-crystalline powder, whereby the positive electrode active material comprises Li in a molar ratio of Li/(Co+Mn+Ni+A) of at least 0.9 and at most 1.1, whereby the positive electrode active material has a tap density which is at least 1.0 gr/cm$^3$ and at most 3.0 g/cm$^3$.

17 Claims, 1 Drawing Sheet

(51) Int. Cl.
  *H01M 4/485* (2010.01)
  *H01M 4/525* (2010.01)

(56) References Cited

U.S. PATENT DOCUMENTS

| | | |
|---|---|---|
| 2018/0047979 A1 | 2/2018 | Iwasaki |
| 2018/0159127 A1 | 6/2018 | Kurita et al. |
| 2019/0020019 A1 | 1/2019 | Kim et al. |
| 2019/0020024 A1* | 1/2019 | Wang .................... C01G 53/50 |
| 2019/0123347 A1* | 4/2019 | Kim ................... H01M 10/0525 |
| 2019/0386294 A1* | 12/2019 | Han ...................... H01M 4/131 |
| 2020/0295368 A1 | 9/2020 | Kong et al. |
| 2021/0265615 A1 | 8/2021 | Choi et al. |

FOREIGN PATENT DOCUMENTS

| | | | |
|---|---|---|---|
| EP | 3636597 A1 | | 4/2020 |
| EP | 3667803 A1 | | 6/2020 |
| JP | 2012517675 A | | 8/2012 |
| JP | 2016225161 A | | 12/2016 |
| JP | 2019021623 A | | 2/2019 |
| JP | 2019021627 A | | 2/2019 |
| JP | 2020166931 A | | 10/2020 |
| JP | 2020167152 A | | 10/2020 |
| KR | 20160023423 A1 | * | 3/2016 |
| KR | 20180014724 A | | 2/2018 |
| KR | 20190006906 A | | 1/2019 |
| KR | 20200018018 A | | 2/2020 |
| KR | 20200031305 A | * | 3/2020 |
| WO | 2013015069 A1 | | 1/2013 |

OTHER PUBLICATIONS

Sim, Seong-Ju, et al., "Effects of lithium tungsten oxide coating on LiNi0.90Co0.05Mn0.05O2 cathode material for lithium-ion batteries", Journal of Power Sources, 2021, pp. 1-6, vol. 481, 229037.
JPO: Notice of Reasons for Rejection for Japanese Patent Application No. 2023-536521, mailed Jul. 7, 2016, 5 pages.
D.J. Singh, "Relationship of Li 2 WO 4 to the scheelite tungstate scintillators: Electronic Structure and atomic positions from density-functional calculations", Physical Review B, vol. 77, 2008, 4 pages.
JPO: Notice of Reasons for Rejection mailed Jul. 8, 2024 for corresponding Japanese Patent Application No. 2023-537161, 5 pages.
Korean Intellectual Property Office: Office Action of Korean Patent Application No. 10-2023-7024294, mailed Apr. 3, 2025, 7 pages.
Korean Intellectual Property Office: Office Action of Korean Patent Application No. 10-2023-7024309, mailed Apr. 4, 2025, 6 pages.

* cited by examiner

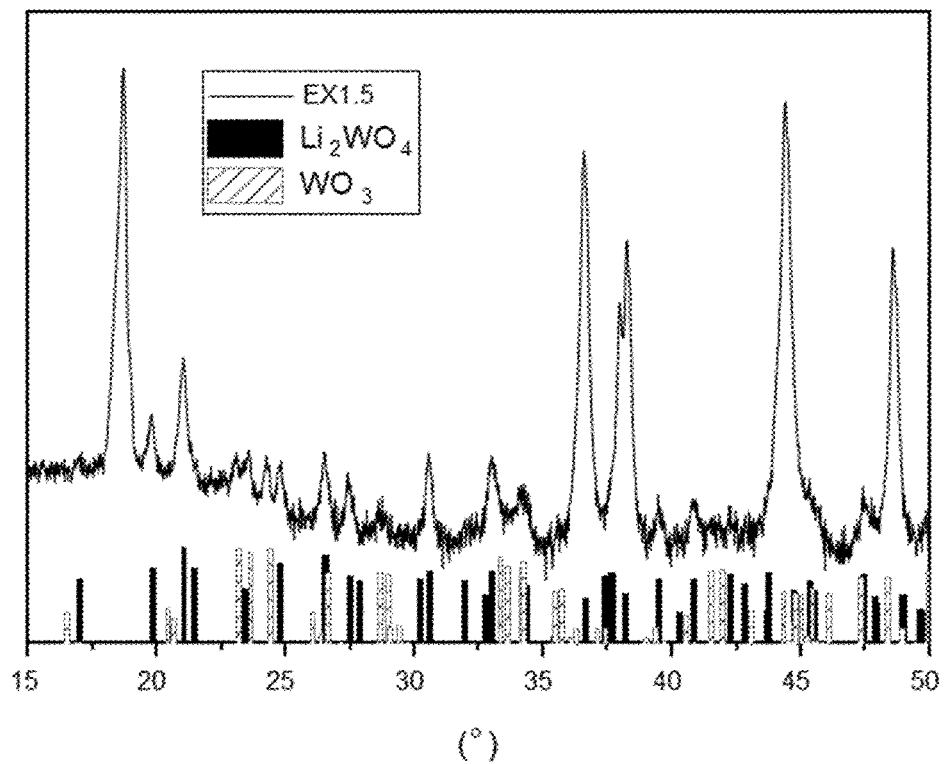

POSITIVE ELECTRODE ACTIVE MATERIAL FOR RECHARGEABLE BATTERIES

CROSS-REFERENCE TO RELATED APPLICATIONS

This application is a U.S. National Stage application of International Patent Application No. PCT/EP2021/086386, filed on Dec. 17, 2021, which claims the benefit of European Patent Application No. 20215507.3, filed on Dec. 18, 2020.

TECHNICAL FIELD

The present invention relates to a positive electrode active material for solid state rechargeable batteries. More specifically, the invention relates to particulate positive electrode active materials comprising tungsten oxides.

BACKGROUND

The applicability of traditional compounds as positive electrode active materials in solid state batteries is limited because of their limited capacity retention after repeated charge-discharge cycles at higher temperatures and higher voltages.

The present invention aims to provide a method for manufacturing a positive electrode active material having improved stability and electrochemical properties, such as a lower capacity leakage ($Q_{total}$).

SUMMARY OF THE INVENTION

This objective is achieved by providing a positive electrode active material for solid state batteries, whereby the positive electrode active material is a powder which comprises Li, M', and O, wherein M' consists of:
  Co in a content x superior or equal to 2.0 mol % and inferior or equal to 35.0 mol %, relative to M',
  Mn in a content y superior or equal to 0 mol % and inferior or equal to 35.0 mol %, relative to M',
  A in a content m superior or equal to 0 mol % and inferior or equal to 5 mol %, relative to M', whereby A comprises at least one element of the group consisting of: Al, Ba, B, Mg, Nb, Sr, Ti, W, S, Ca, Cr, Zn, V, Y, Si, and Zr,
  Ni in a content of 100-x-y-m mol %,
  i. a first compound which comprises $Li_2WO_4$
  ii. and a second compound which comprises $WO_3$,
whereby the powder is a single-crystalline powder,
whereby the positive electrode active material comprises Li in a molar ratio of Li/(Co+Mn+Ni+A) of at least 0.9 and at most 1.1,
whereby the positive electrode active material has a tap density which is at least 1.0 g/cm$^3$ and at most 3.0 g/cm$^3$.

Further, the present invention provides an electrochemical cell comprising a positive electrode active material according to the first aspect of the invention; a solid state battery comprising a positive electrode active material according to the first aspect of the invention; and a use of a positive electrode active material according to the first aspect of the invention in a battery.

BRIEF DESCRIPTION OF THE FIGURE

By means of further guidance, a FIGURE is included to better appreciate the teaching of the present invention. Said FIGURE is intended to assist the description of the invention and is nowhere intended as a limitation of the presently disclosed invention.

FIG. 1 shows an X-ray diffractogram of a positive electrode active material powder according to EX1.5 comprising $Li_2WO_4$ and $WO_3$ compounds. In this FIGURE the horizontal axis shows the diffraction angle 2θ in degrees, the vertical axis shows the signal intensity on a logarithmic scale.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. As used herein, the following terms have the following meanings:

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

The recitation of numerical ranges by endpoints includes all numbers and fractions subsumed within that range, as well as the recited endpoints. All percentages are to be understood as percentage by weight, abbreviated as "wt %" unless otherwise defined or unless a different meaning is obvious to the person skilled in the art from its use and in the context wherein it is used.

D50 is defined herein as the particle size at 50% of the cumulative volume % distributions of the positive electrode active material powder which may be determined by laser diffraction particle size analysis.

Positive Electrode Active Material

In a first aspect, the present invention provides a positive electrode active material for solid state rechargeable batteries, whereby the positive electrode active material is a powder which comprises Li, M', and O, wherein M' consists of:
  Co in a content x superior or equal to 2.0 mol % and inferior or equal to 35.0 mol %, relative to M',
  Mn in a content y superior or equal to 0 mol % and inferior or equal to 35.0 mol %, relative to M',
  A in a content m superior or equal to 0 mol % and inferior or equal to 5 mol %, relative to M', whereby A comprises at least one element of the group consisting of: Al, Ba, B, Mg, Nb, Sr, Ti, W, S, Ca, Cr, Zn, V, Y, Si, and Zr,
  Ni in a content of 100-x-y-m mol %, relative to M',
  iii. a first compound which comprises $Li_2WO_4$
  iv. and a second compound which comprises $WO_3$,
whereby the powder is a single-crystalline powder,
whereby the positive electrode active material comprises Li in a molar ratio of Li/(Co+Mn+Ni+A) of at least 0.9 and at most 1.1.

Preferably, the positive electrode active material has a tap density which is at least 1.0 g/cm$^3$ and at most 3.0 g/cm$^3$.

A single-crystalline powder is considered to be a powder in which 80% or more of the particles in a field of view of at least 45 μm×at least 60 μm (i.e. of at least 2700 μm 2), preferably of: at least 100 µm×100 µm (i.e. of at least 10,000 µm 2) in a SEM image have a single-crystalline morphology.

A particle is considered to have single-crystalline morphology if it consists of only one grain, or a very low number of a most five, constituent grains, as observed by SEM or TEM.

For the determination of single-crystalline morphology of particles, grains which have a largest linear dimension as observed by SEM which is smaller than 20% of the median particle size D50 of the powder as determined by laser diffraction are ignored. This avoids that particles which are in essence single-crystalline, but which may have deposited on them several very small other grains, are inadvertently considered as not having a single-crystalline morphology.

The inventors have found that a positive electrode active material for solid state batteries according to the invention indeed allows a higher DQ1 and lower IRRQ. This is illustrated by examples and the results provided in the Table 2.

Preferably, the present invention provides a positive electrode active material according to the first aspect of the invention, wherein the total content of tungsten is at least 0.20 wt. % and/or at most 2.50 wt. % with respect to the total weight of said positive electrode active material, as determined by ICP-OES analysis, whereby ICP-OES means Inductively coupled plasma—optical emission spectrometry. Preferably, said weight ratio is between 0.25 wt. % and 2.00 wt. % and more preferably, said weight ratio is equal to 0.30, 0.50, 1.00, 1.50, 2.00 wt. % or any value there in between.

A positive active material is defined as a material which is electrochemically active in a positive electrode of a solid state battery. By active material, it must be understood a material capable to capture and release Li ions when subjected to a voltage change over a predetermined period of time.

The content of each element can be determined by known analysis methods, such as ICP-OES (Inductively coupled plasma—optical emission spectrometry).

Preferably, Ni content 100-x-y-m in the positive electrode active material is 60 mol % and more preferably ≥65 mol %, relative to M'.

Preferably, Ni content 100-x-y-m in the positive electrode active material is 95 mol % and more preferably ≤90 mol %, relative to M'.

Preferably, Mn content y in the positive electrode active material is 0 mol % and more preferably ≥5 mol %, relative to M'.

Preferably, Mn content y in the positive electrode active material is 35 mol % and more preferably ≥30 mol % relative to M'.

Preferably, Co content x in the positive electrode active material is 2 mol % and more preferably ≥5 mol %, relative to M'.

Preferably, Co content x in the positive electrode active material is 35 mol % and more preferably ≤30 mol %, relative to M'.

Preferably, A content m in the positive electrode active material is superior or equal to 0.01 mol %, relative to M'.

Preferably, A content m in the positive electrode active material is inferior or equal to 2.0 mol %, relative to M'.

Preferably, the tap density of the positive electrode active material is at least 1.5 g/cm$^3$, and more preferably is at least 1.7 g/cm$^3$.

Preferably, the tap density of the positive electrode active material is at most 2.7 g/cm$^3$, and more preferably is at most 2.5 g/cm$^3$.

Tapped density of the positive electrode active material of the present invention is the ratio of the weight (W in gram) of the powder to the final volume (V in cm$^3$) occupied by the powder after it has been tapped for a defined period of time, such as 5000 times. The tap density is calculated as W/V.

First Compound and Second Compound

Preferably, the present invention provides a positive electrode active material according to the first aspect of the invention, wherein the first compound comprises $Li_2WO_4$ and belongs to the R-3 space group and a second compound comprises $WO_3$ and belongs to the P21/n space group, as determined by X-Ray diffraction analysis.

Preferably, the present invention provides a positive electrode active material according to the first aspect of the invention, wherein the total content of tungsten is between 0.20 wt. % and 2.50 wt. % with respect to the total weight of said positive electrode active material, as determined by ICP-OES analysis. Preferably, said weight ratio is between 0.25 wt. % and 2.00 wt. % and more preferably, said weight ratio is equal to 0.50, 1.00, 1.50, 2.00 wt. % or any value there in between.

In a second aspect, the present invention provides a battery cell comprising a positive electrode active material according to the first aspect of the invention.

In a third aspect, the present invention provides a use of a positive electrode active material according to the first aspect of the invention in a battery of either one of a portable computer, a tablet, a mobile phone, an electrically powered vehicle, and an energy storage system.

Lithium Transition Metal Oxide Third Compound

Preferably, the present invention provides a positive electrode active material according to the first aspect of the invention, whereby the positive electrode active material comprises a third compound which belongs to the R-3m space group as determined by X-Ray diffraction analysis.

Preferably, said third compound is a lithium transition metal oxide i.e. a Li-M'-oxide as defined herein above. The lithium transition metal oxide is identified by X-Ray diffraction analysis. According to "Journal of Power Sources (2000), 90, 76-81", the lithium transition metal oxide has a crystal structure which belongs to the R-3m space group.

Electrochemical Cell

In a second aspect, the present invention provides an electrochemical cell comprising a positive electrode active material according to the first aspect of the invention; a lithium ion rechargeable battery comprising a liquid electrolyte and a positive electrode active material according to the first aspect of the invention; and a use of a positive electrode active material according to the first aspect of the invention in a battery of either one of a portable computer, a tablet, a mobile phone, an electrically powered vehicle and an energy storage system.

Method for Preparing a Positive Electrode Active Material

Preferably, the present invention provides a method for preparing a positive electrode active material according to the first aspect of the invention, as described herein above, wherein the method comprises the following steps of:

mixing a single-crystalline lithium transition metal oxide powder with a W containing compound so as to obtain a mixture, heating the mixture in an oxidizing atmosphere at a temperature of between 250° C. and 450° C. so as to obtain the positive electrode active material.

Preferably, the W containing compound is $WO_3$.

Preferably, the amount of W used is in said process is between 0.20 wt. % and 2.50 wt. % with respect to the total weight of said positive electrode active material, as determined by ICP-OES analysis.

Preferably, the mixture is heated at a temperature of between 300° C. and 400° C., and more preferably at a temperature of between 325° C. and 375° C.

Preferably, the heated powder and/or positive electrode material is further processed, for example by crushing and/or sieving.

Optionally, the lithium transition metal oxide comprises A, wherein A comprises at least one element selected from the group consisting of: Al, Ba, B, Mg, Nb, Sr, Ti, W, S, Ca, Cr, Zn, V, Y, Si, and Zr.

EXAMPLES

The following examples are intended to further clarify the present invention and are nowhere intended to limit the scope of the present invention.

1. Description of Analysis Method 1.1. Inductively Coupled Plasma

The composition of a positive electrode active material powder is measured by the inductively coupled plasma (ICP) method using an Agilent 720 ICP-OES (Agilent Technologies, https://www.agilent.com/cs/library/brochures/5990-6497EN %20720-725 ICP-OES LR.pcif). 1 gram of powder sample is dissolved into 50 mL of high purity hydrochloric acid (at least 37 wt. % of HCl with respect to the total weight of solution) in an Erlenmeyer flask. The flask is covered by a watch glass and heated on a hot plate at 380° C. until the powder is completely dissolved. After being cooled to room temperature, the solution from the Erlenmeyer flask is poured into a first 250 mL volumetric flask. Afterwards, the first volumetric flask is filled with deionized water up to the 250 mL mark, followed by a complete homogenization process ($1^{st}$ dilution). An appropriate amount of the solution from the first volumetric flask is taken out by a pipette and transferred into a second 250 mL volumetric flask for the $2^{nd}$ dilution, where the second volumetric flask is filled with an internal standard element and 10% hydrochloric acid up to the 250 mL mark and then homogenized. Finally, this solution is used for ICP-OES measurement.

1.2. Particle Size Distribution

The particle size distribution (PSD) of the positive electrode active material powder is measured by laser diffraction particle size analysis using a Malvern Mastersizer 3000 with a Hydro MV wet dispersion accessory (https://www-.malvernpanalytical.com/en/products/product-range/mastersizer-range/mastersizer-3000 # overview) after having dispersed each of the powder samples in an aqueous medium. In order to improve the dispersion of the powder, sufficient ultrasonic irradiation and stirring is applied, and an appropriate surfactant is introduced. D50 is defined as the particle size at 50% of the cumulative volume % distributions obtained from the Malvern Mastersizer 3000 with Hydro MV measurements.

1.3. X-Ray Diffraction

The X-ray diffraction pattern of the positive electrode active material is collected with a Rigaku X-Ray Diffractometer D/max2000 (Rigaku, Du, Y., et al. (2012). A general method for the large-scale synthesis of uniform ultrathin metal sulphide nanocrystals. Nature Communications, 3(1)) using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 185 mm. For the XRD, diffraction patterns are obtained in the range of 15-70° (2θ) with a scan speed of 1° per min and a step-size of per scan.

1.4. Polymer Cell Test 1.4.1. Polymer Cell Preparation 1.4.1.1. Solid Polymer Electrolyte (SPE) Preparation Solid polymer electrolyte (SPE) is prepared according to the process as follows:

Step 1) Mixing polyethylene oxide (PEO having a molecular weight of 1,000,000, Alfa Aesar https://www.alfa.co.kr/AlfaAesarApp/faces/adf.task-flow?adf.tfId= ProductDetailsTF&adf.tfDoc=/WEB-INF/ProductDetails-TF.xml&ProductId=043678& afrLoop=101052020-9597576& afrWindowM ode=0& afrWindowId=null) with Lithium bis(trifluoromethanesulfonyl)imide salt (LiTFSI, Soulbrain Co., Ltd.) in acetonitrile anhydrous 99.8 wt. % (Aldrich https://www.sigmaaldrich.com/catalog/product/sia1/271004?lang=ko&region= KR&gclid=EAI aIQob ChMIwcrB0dDL6AIVBbeWChOieAXREAAYASAAEg3 Ca_D_BwE), using a mixer for 30 minutes at 2000 revolutions per minute (rpm). The molar ratio of ethylene oxide to lithium is 20.

Step 2) Pouring the mixture from Step1) into a Teflon dish and dried in 25° C. for 12 hours.

Step 3) Detaching the dried SPE from the dish and punching the dried SPE in order to obtain SPE disks having a thickness of 300 μm and a diameter of 19 mm.

1.4.1.2. Positive Electrode Preparation

The positive electrode is prepared according to the process as follows:

Step 1) Preparing a polymer electrolyte mixture comprising polycaprolactone (PCL having a molecular weight of 80,000, Sigma-Aldrich https://www.sigmaaldrich.com/catalog/product/aldrich/440744) solution in anisole anhydrous 99.7 wt. % (Sigma-Aldrich, https://www.sigmaaldrich-.comicatalog/product/sial/296295) and bis(trifluoromethanesulfonyl)imide salt (LiTFSI, Sigma-Aldrich, https://www.sigmaaldrich.com/catalog/product/aldrich/544094) in acetonitrile. The mixture has a ratio of PCL:LiTFSI of 74:26 by weight.

Step 2) Mixing a polymer electrolyte mixture prepared from Step 1), a positive electrode active material, and a conductor powder (Super P, Timcal (Imerys Graphite & Carbon), http://www.imerys-graphite-and-carbon.com/wordpress/wp-app/uploads/2018/10/ENSAC0-150-210-240-250-260-350-360-G-ENSAC0-150-250-P-SUPER-P-SUPER-P-Li-C-NERGY-SUPER-C-45-65-T_V-2.2_-USA-SDS.pdf) in acetonitrile solution with a ratio of 21:75:4 by weight so as to prepare a slurry mixture. The mixing is performed by a homogenizer for 45 minutes at 5000 rpm.

Step 3) Casting the slurry mixture from Step 2) on one side of a 20 μm-thick aluminum foil with 100 μm coater gap.

Step 4) Drying the slurry-casted foil at 30° C. for 12 hours followed by punching in order to obtain positive electrodes having a diameter of 14 mm.

1.4.1.3. Polymer Cell Assembling

The coin-type polymer cell is assembled in an argon-filled glovebox with an order from bottom to top: a 2032 coin cell can, a positive electrode prepared from section 1.5.1.2, a SPE prepared from section 1.5.1.1, a gasket, a Li anode, a spacer, a wave spring, and a cell cap. Then, the coin cell is completely sealed to prevent leakage of the electrolyte.

1.4.2. Testing Method

Each coin-type polymer cell is cycled at 80° C. using a Toscat-3100 computer-controlled galvanostatic cycling stations (from Toyo, http://www.toyosystem.com/image/menu3/toscat/TOSCAT-3100.pdf). The coin cell testing procedure uses a 1 C current definition of 160 mA/g in the 4.4-3.0 V/Li metal window range according to the schedule below:

Step 1) Charging in a constant current mode with C-rate of 0.05 with an end condition of 4.4 V followed by 10 minutes rest.

Step 2) Discharging in a constant current mode with C-rate of 0.05 with an end condition of 3.0 V followed by 10 minutes rest.

Step 3) Charging in a constant current mode with C-rate of 0.05 with an end condition of 4.4 V, Step 4) Switching to a constant voltage mode and keeping 4.4 V for 60 hours.

Step 5) Discharging in a constant current mode with C-rate of 0.05 with an end condition of 3.0 V.

$Q_{total}$ is defined as the total leaked capacity at the high voltage and high temperature in the Step 4) according to the described testing method. A low value of $Q_{total}$ indicates a high stability of the positive electrode active material powder during a high temperature operation.

1.5. Tap Density

The tap density measurement of the positive electrode active material in this invention is carried out by mechanically tapping a graduated measuring cylinder 100 mL containing positive electrode active material. After observing powder weight (W in gram), the measuring cylinder is mechanically tapped for 5000 times, so that no further volume change observed, and final volume (V in cm 3) is read. The tap density is calculated as W/V.

2. Examples and Comparative Examples

Comparative Example 1

A single-crystalline positive electrode active material labelled as CEX1 is prepared according to the following steps:

Step 1) Transition metal oxidized hydroxide precursor preparation: A nickel-based transition metal oxidized hydroxide powder (TMH1) having a metal composition of $Ni_{0.86}Mn_{0.07}Co_{0.07}$ is prepared by a co-precipitation process in a large-scale continuous stirred tank reactor (CSTR) with mixed nickel manganese cobalt sulfates, sodium hydroxide, and ammonia.

Step 2) Heating: the TMH1 prepared from Step 1) is heated at 400° C. for 7 hours in an oxidizing atmosphere to obtain a heated powder.

Step 3) First mixing: the heated powder prepared from Step 2) is mixed with LiOH in an industrial blender so as to obtain a first mixture having a lithium to metal ratio of 0.96.

Step 4) First firing: The first mixture from Step 3) is fired at 890° C. for 11 hours in an oxidizing atmosphere so as to obtain a first fired powder.

Step 5) Wet bead milling: The first fired powder from Step 4) is bead milled in a solution containing 0.5 mol % Co with respect to total molar contents of Ni, Mn, and Co in the first fired powder followed by filtering, drying, and sieving process so as to obtain a milled powder. The bead milling solid to solution weight ratio is 6:4 and is conducted for 20 minutes.

Step 6) Second mixing: the milled powder from Step5) is mixed in an industrial blender with 1.5 mol % Co from $Co_3O_4$ and 7.5 mol % Li from LiOH, each with respect to the total molar contents of Ni, Mn, and Co in the milled powder, so as to obtain a second mixture. Step 7) Second firing: the second mixture from Step 6) is fired at 760° C. for 10 hours in a oxidizing atmosphere, followed by crushing and sieving process so as to obtain a second fired powder labelled as CEX1. The tap density of CEX1 is 2.1 g/cm 3.

Example 1

EX1.1 is prepared according to the following process:

Step 1) CEX1 is mixed with $WO_3$ powder to obtain a mixture contains about 0.36 wt. % of tungsten with respect to the total weight of the mixture.

Step 2) Heating the mixture obtained from Step 1) in a furnace under the flow of an oxidizing atmosphere at 350° C. for 10 hours.

Step 3) Crushing and sieving the heated product from Step 2) so as to obtain a powder labelled as EX1.1.

EX1.2, EX1.3, EX1.4, and EX1.5 are prepared according to the same method as EX1.1 except that in the Step 1) CEX2 is mixed with $WO_3$ powder so as to obtain a mixture contains about 0.43, 0.48, 0.75, and 1.50 wt. % of tungsten with respect to the total weight of the mixture, respectively.

Table 1 summarizes the composition of examples and comparative example and their corresponding electrochemical properties. A strong improvement of $Q_{total}$ following the introduction of W and the formation of $Li_2WO_4$ and $WO_3$ is observed.

The particle size distributions of the products from the examples and comparative example were determined by a Malvern Mastersizer 3000. These products all have a median particle size D50 of between 3.8 and 4.6 μm. The tap density of EX1.1 is 2.1 g/cm 3.

Comparative Example 2

A single-crystalline positive electrode active material labelled as CEX5 is prepared according to the following steps:

Step 1) Transition metal oxidized hydroxide precursor preparation: A nickel-based transition metal oxidized hydroxide powder (TMH2) having a metal composition of $Ni_{0.68}Mn_{0.20}Co_{0.12}$ is prepared by a co-precipitation process in a large-scale continuous stirred tank reactor (CSTR) with mixed nickel manganese cobalt sulfates, sodium hydroxide, and ammonia.

Step 2) First mixing: TMH2 prepared from Step 1) is mixed with LiOH in an industrial blender so as to obtain a first mixture having a lithium to metal ratio of 0.97.

Step 4) First firing: The first mixture from Step 2) is fired at 920° C. for 10 hours in an oxidizing atmosphere so as to obtain a first fired powder.

Step 5) Jet milling: The first fired powder from Step 4) is jet milled to obtain a milled powder labelled as CEX2.

Example 2

A single-crystalline positive electrode active material labelled as EX2 is prepared according to the following steps:

Step 1) CEX2 is mixed with $WO_3$ powder to obtain a mixture contains about 0.45 wt. % of tungsten with respect to the total weight of the mixture.

Step 2) Heating the mixture obtained from Step 1) in a furnace under the flow of an oxidizing atmosphere at 350° C. for 10 hours.

Step 3) Crushing and sieving the heated product from Step 2) so as to obtain a powder labelled as EX2.

TABLE 1

Summary of the composition and the corresponding electrochemical properties of example and comparative examples.

| ID | Ni (mol %)* | W (wt. %)** | Heating T (° C.) | Phase*** | $Q_{total}$ (mAh/g) |
|---|---|---|---|---|---|
| CEX1 | 83 | 0.00 | — | — | 40.2 |
| EX1.1 | 83 | 0.36 | 350 | $Li_2WO_4$ + $WO_3$ | 39.5 |
| EX1.2 | 83 | 0.42 | 350 | $Li_2WO_4$ + $WO_3$ | 37.3 |
| EX1.3 | 83 | 0.50 | 350 | $Li_2WO_4$ + $WO_3$ | 33.5 |
| EX1.4 | 83 | 0.73 | 350 | $Li_2WO_4$ + $WO_3$ | 29.9 |
| EX1.5 | 83 | 1.42 | 350 | $Li_2WO_4$ + $WO_3$ | 30.4 |
| CEX2 | 67 | 0.00 | — | — | 47.0 |
| EX2 | 67 | 0.45 | 350 | $Li_2WO_4$ + $WO_3$ | 32.6 |

*as calculated by ICP-OES measurement, relative to Ni + Mn + Co
**as determined by ICP-OES measurement
***as determined by XRD analysis
—: not applicable X-ray diffractometry is conducted to identify tungsten phases. FIG. 1 shows the XRD pattern of EX1.5.

According to "Journal of Power Sources (2000), 90, 76-81", the XRD pattern indicates that EX 1.5 is mainly formed of lithium transition metal oxide compounds. They have a general formula of $LiNi_{0.86}Mn_{0.07}Co_{0.07}O_2$. EX1.5 shows R-3m, R-3, and P21/n phases which correspond to $LiNi_{0.86}Mn_{0.07}Co_{0.07}O_2$, $Li_2WO_4$, and $WO_3$, respectively. This result indicates that 350° C. heating temperature is suitable to produce the first and second compound phases according to this invention.

It is when the aforementioned R-3m, R-3, and P21/n phases presence in the positive electrode active material, the electrochemical properties are improved.

Electrochemical properties are further characterized in a polymer cell wherein EX1.1 to EX1.5 comprising tungsten all show $Q_{total}$ lower than that CEX1 without tungsten. Similarly, EX2 comprising 67 mol % Ni and 0.45 wt % W show lower $Q_{total}$ in comparison with CEX2 which comprises the same Ni amount.

The invention claimed is:

1. A positive electrode active material for solid state rechargeable batteries, whereby the positive electrode active material is a powder which comprises
   i. Li, M', and O, wherein M' consists of:
      Co in a content x greater than or equal to 2.0 mol % and less than or equal to 35.0 mol %, relative to the molar composition of M',
      Mn in a content y greater than or equal to 0 mol % and less than or equal to 35.0 mol %, relative to the molar composition of M',
      A in a content m greater than or equal to 0 mol % and less than or equal to 5 mol %, relative to the molar composition of M', whereby A comprises at least one element of the group consisting of: Al, Ba, B, Mg, Nb, Sr, Ti, W, S, Ca, Cr, Zn, V, Y, Si, and Zr, and
      Ni in a content of 100-x-y-m mol %,
   ii. a first compound which comprises $Li_2WO_4$
   iii. and a second compound which comprises $WO_3$, wherein the total content of tungsten is between 0.42 wt. % and 2.50 wt. % with respect to the total weight of said positive electrode active material, as determined by ICP-OES analysis, and wherein the total content of tungsten includes tungsten present in the first compound and the second compound,
   whereby the powder is a single-crystalline powder,
   whereby the positive electrode active material comprises Li in a molar ratio of Li/(Co+Mn+Ni+A) of at least 0.9 and at most 1.1,
   whereby the positive electrode active material has a tap density which is at least 1.0 g/cm³ and at most 3.0 g/cm³.

2. The positive electrode active material according to claim 1, whereby the positive electrode active material comprises a third compound which has a crystal structure which belongs to the R-3m space group.

3. The positive electrode active material according to claim 1, whereby the positive electrode active material comprises a third compound which is a Li-M'-oxide.

4. The positive electrode active material according to claim 1, whereby said first compound has a crystal structure which belongs to the R-3 space group, and whereby said second compound has a crystal structure which belongs to the P21/n space group, as determined by X-Ray diffraction analysis.

5. The positive electrode active material according to claim 1, wherein the total content of tungsten is between 0.42 wt. % and 2.00 wt. % with respect to the total weight of said positive electrode active material, as determined by ICP-OES analysis.

6. The positive electrode active material according to claim 1, wherein the positive electrode active material has a median particle size D50 of between 2 μm and 7 μm, as determined by laser diffraction particle size analysis.

7. The positive electrode active material according to claim 1, whereby m is less than 2.0 mol %, relative to the molar composition of M'.

8. The positive electrode active material according to claim 1, whereby the first compound is $Li_2WO_4$.

9. The positive electrode active material according to claim 1, whereby the second compound is $WO_3$.

10. The positive electrode active material according to claim 1, wherein Ni content 100-x-y-m is between 60 mol % to 95 mol %, relative to M'.

11. The positive electrode active material according to claim 1, wherein the tap density is between 1.5 g/cm³ and 2.7 g/cm³.

12. A solid state battery comprising a positive electrode active material according to claim 1.

13. A battery cell comprising a positive electrode active material according to claim 1.

14. A portable computer, a tablet, a mobile phone, an electrically powered vehicle, or an energy storage system comprising a positive electrode active material according to claim 1.

15. The positive electrode active material according to claim 1, wherein the total content of tungsten is between 0.42 wt. % and 1.5 wt. % with respect to the total weight of said positive electrode active material, as determined by ICP-OES analysis.

16. The positive electrode active material according to claim 1, wherein the total content of tungsten is between 0.42 wt. % and 1.42 wt. % with respect to the total weight of said positive electrode active material, as determined by ICP-OES analysis.

17. The positive electrode active material according to claim 16, wherein the Ni content 100-x-y-m is between 67 mol % to 83 mol %, relative to M'.

* * * * *